United States Patent [19]
Harter et al.

[11] Patent Number: 5,742,802
[45] Date of Patent: Apr. 21, 1998

[54] METHOD AND SYSTEM FOR EFFICIENTLY MAPPING GUEST INSTRUCTION IN AN EMULATION ASSIST UNIT

[75] Inventors: Ronald S. Harter; Gary Douglas Huber; Arturo Martin-de-Nicolas, all of Austin, Tex.; Seungyoon Peter Song, Los Altos, Calif.

[73] Assignee: International Business Machines Corporation, Armonk, N.Y.

[21] Appl. No.: 602,653

[22] Filed: Feb. 16, 1996

[51] Int. Cl.$^6$ ................................................. G06F 9/455
[52] U.S. Cl. ................................... 395/568; 395/500
[58] Field of Search ................................. 395/500, 568

[56] References Cited

U.S. PATENT DOCUMENTS

| | | |
|---|---|---|
| 4,860,199 | 8/1989 | Landendorf et al. . |
| 4,920,481 | 4/1990 | Binkley et al. . |
| 4,992,934 | 2/1991 | Portanova et al. . |
| 5,088,033 | 2/1992 | Binkley et al. . |
| 5,317,740 | 5/1994 | Sites . |
| 5,392,408 | 2/1995 | Fitch . |
| 5,406,644 | 4/1995 | MacGregor . |
| 5,574,873 | 11/1996 | Davidian ........................ 395/376 |
| 5,574,927 | 11/1996 | Scantlin ........................ 395/376 |

*Primary Examiner*—William M. Treat
*Attorney, Agent, or Firm*—Sawyer & Associates; Volel Emile

[57] ABSTRACT

The present invention provides a method and system for using hardware to assist software in emulating the guest instructions. The method and system comprises an emulation assist unit (EAU) which efficiently maps a guest instruction to a unique tag, an index, and an address of the corresponding semantic routine. The index determines where in a cache a plurality of tags are stored. A separate cache within the EAU stores each tag in association with the address the first time the corresponding guest instruction is emulated. Thus, the emulation assist unit also dynamically responds to the set of guest instructions being emulated. The first time a guest instruction is emulated, the EAU determines the address and stores the address in the cache in association with the tag. When the guest instruction is emulated again, the EAU uses the tag to access the stored addresses of the corresponding semantic routine.

43 Claims, 4 Drawing Sheets

METHOD AND SYSTEM FOR EFFICIENTLY MAPPING GUEST INSTRUCTION IN AN EMULATION ASSIST UNIT

FIELD OF THE INVENTION

The present invention relates to a method and system for emulating guest instructions in a host processor, and more particularly to a method and system for efficiently mapping guest instructions to the addresses of the corresponding semantic routines.

BACKGROUND OF THE INVENTION

Each computer system has a particular computer architecture. This architecture is generally not directly compatible with other architectures. For example, the Motorola PowerPC™ and Intel x86 have different architectures. However, one architecture, such as the Motorola PowerPC™, is capable of using instruction sets from another architecture, such as the Intel x86. These instructions from a foreign architecture are referred to as guest instructions. In order to use these guest instructions, the host architecture must emulate the guest instructions.

Conventional methods for emulating a guest instruction are known as interpretation and dynamic translation. Interpreters mimic the fetch-decode-execute cycle in traditional processors. Consequently, interpreters fetch the guest instruction, decode it, and dispatch a corresponding semantic routine. The semantic routine is the sequence of host instructions necessary to carry out the operations specified by the corresponding guest instruction. Dynamic translators fetch and decode a block of instructions, then translate them into host instructions. These host instructions are stored and reused.

Interpreters are slower than dynamic translators. However, dynamic translators perform poorly when the guest program modifies portions that have already been translated. In addition, dynamic translators use more memory than interpreters.

The assignee of the present application has developed hardware that assists software emulation methods in order to obtain a solution that has the positive characteristics of both methods: the small size of the interpreter and the speed of execution of the dynamic translator. When the assisting hardware is used, the sequence of host instructions necessary to perform the function of each guest instruction are compiled into semantic routines, which are stored in memory. The hardware works in conjunction with software to fetch guest instructions, decode them, and dispatch the corresponding semantic routine in the host processor.

An additional problem exists in conventional software used in emulating guest instructions. Conventional methods store and search for the addresses of semantic routines inefficiently. For example, one conventional method of decoding guest instructions uses the first two bytes of a guest instruction to select the address of the corresponding semantic routine. In this example, an emulator may reserve a dispatch table containing the first two host instructions of each semantic routine. The index consists of the first two bytes of the guest instructions, that is, 16 bits which represents 65,536 combinations. Each entry includes two host instructions and there are 4 bytes per host instruction. Therefore, in order to allow for all possible combinations in the first two bytes, 500,000 locations are set aside for storage of addresses. However, programs typically use only a small subset of the total possible combinations of the first two bytes. Consequently, when these two bytes are used to index an address, only a small subset of the memory set aside for storage of semantic routines will actually be used in executing the program. These hot spots, where host instructions reside, are randomly distributed in the host processor's memory. This random distribution of addresses also slows access to semantic routines because processor caches require spatial locality of reference.

Accordingly, what is needed is a system and method for emulating guest instructions which efficiently maps a guest instruction to the address of the corresponding semantic routine. The present invention addresses such a need.

SUMMARY OF THE INVENTION

The present invention provides a method and system for using hardware to assist software in emulating the guest instructions. The method and system comprises an emulation assist unit (EAU) which maps guest instructions to a tag and an address of the corresponding semantic routine. The tag and address are stored in a separate cache within the EAU the first time that the corresponding guest instruction is emulated. The method and system further comprise a tag generator which provides an unique tag from each of the guest instructions, and a cache for storing the tag in association with the address of the semantic routines corresponding the guest instruction. Thus, the emulation assist unit dynamically responds to the set of guest instructions being executed.

According to the system and method disclosed herein, the present invention possesses the speed of dynamic translators while using a host cache memory efficiently, thereby increasing overall system performance.

DESCRIPTION OF THE INVENTION

The present invention relates to an improvement in emulating guest instructions in a host processor. In particular, the present invention provides for a method and system for efficiently mapping a guest instruction to the address of the corresponding semantic routine. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
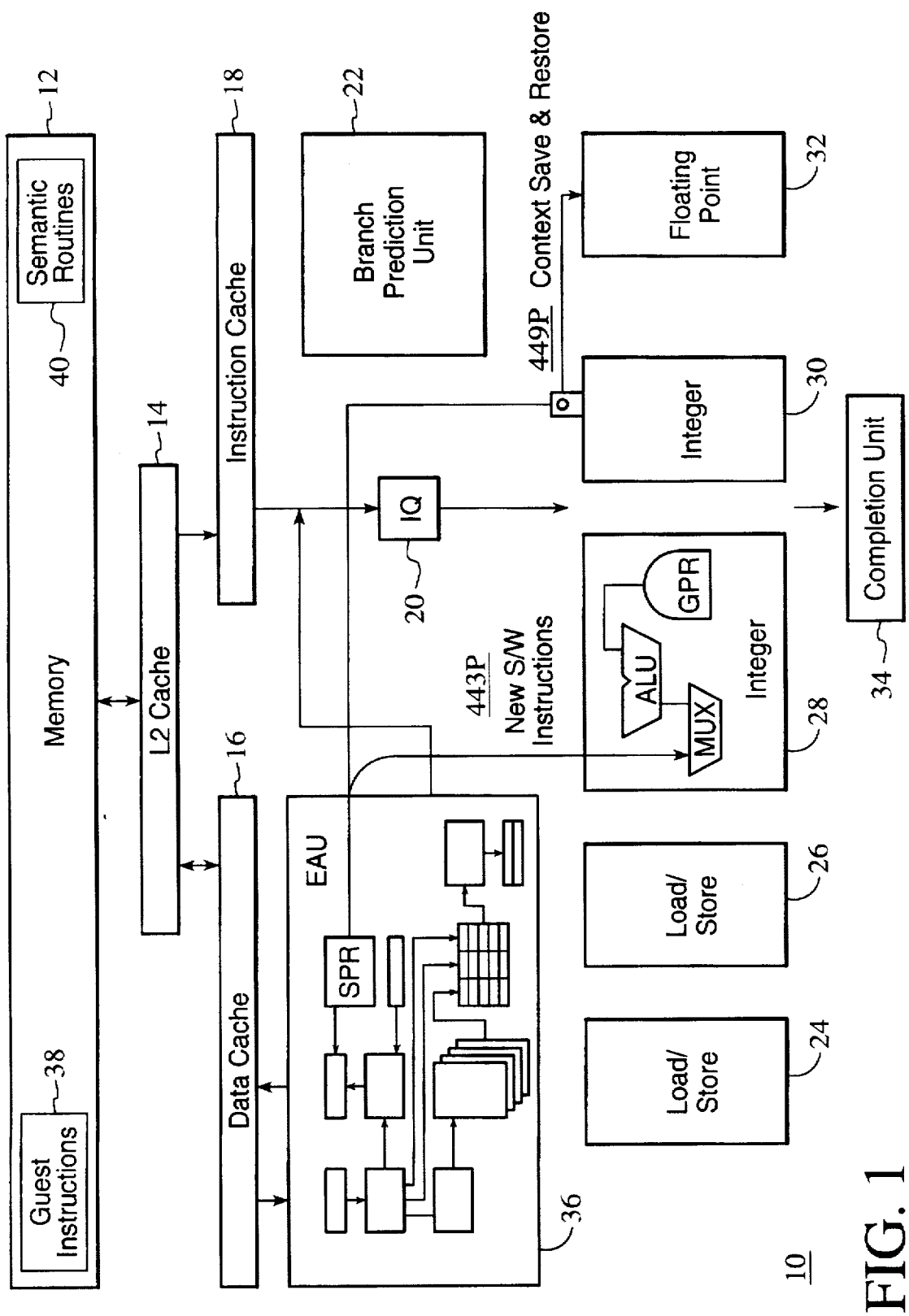
FIG. 1 is a block diagram of one embodiment of the host architecture including the EAU.

FIG. 1 is a block diagram of host processor 10 including emulation assist unit (EAU) 36. Typically, host processor 10 executes software instructions using various conventional hardware components, such as memory 12, L2 cache 14, data cache 16, instruction cache 18, instruction queue (IQ) 20, branch prediction unit 22, functional units 24–32, and completion buffer 34. Memory 12 holds guest instructions 38 and host semantic routines 40, which allow the host to execute guest instructions 38.

In a preferred embodiment, host processor 10 is a Power PC manufactured by IBM. Thus, the host architecture executes PowerPC instructions. The preferred embodiment is also capable of emulating a variety of guest instructions 38, such as Intel x86 instructions. Although the preferred embodiment will be described with respect to a PowerPC host and Intel x86 guest instructions, the method and system are applicable to other host architectures and other guest architectures. Thus, the description should not be construed to limit the guest instructions or host architectures to which the method and system are applicable.

The hardware component that assists host processor 10 in emulating guest instructions 38 is EAU 36. To enable host processor 10 to emulate guest instructions 38, each guest instruction 38 is translated into a corresponding set of host instructions that perform the same functions, called a semantic routine on demand. Each semantic routine 40 is stored at a specific address location in memory 12. Guest instructions 38 are also stored in memory 12.

In operation, host processor 10 caches guest instructions 38 and dam into L2 cache 14 and data cache 16, respectively. EAU 36 fetches and decodes guest instructions 38, then maps each of the guest instructions 38 into the address of the corresponding semantic routine 40. Processor 10 fetches the semantic routine 40 located at the specified memory address into instruction cache 18. The host instructions contained in semantic routine 40 are then transferred to IQ 20. Each host instruction is then decoded and executed using the branch prediction unit 22 and functional units 24–32. Semantic routines 40 are executed and the results stored in completion buffer 34. EAU 36 maps the host address of the next guest instruction 38 parallel with its completion of the previous one, and the process repeats.

Figure 2:
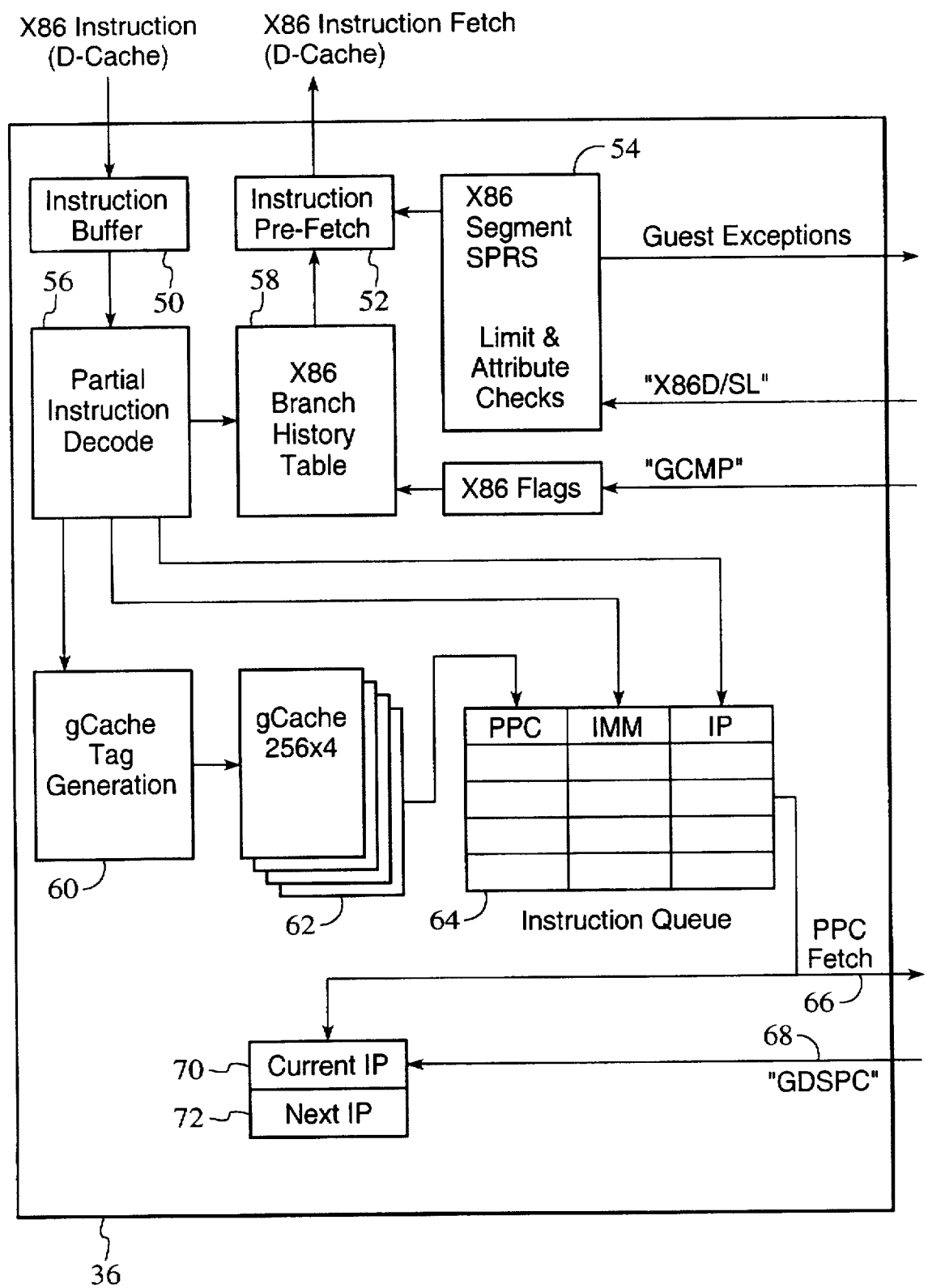
FIG. 2 is a flow chart depicting the one embodiment of process for using the EAU to emulate guest instructions.
Figure 3:
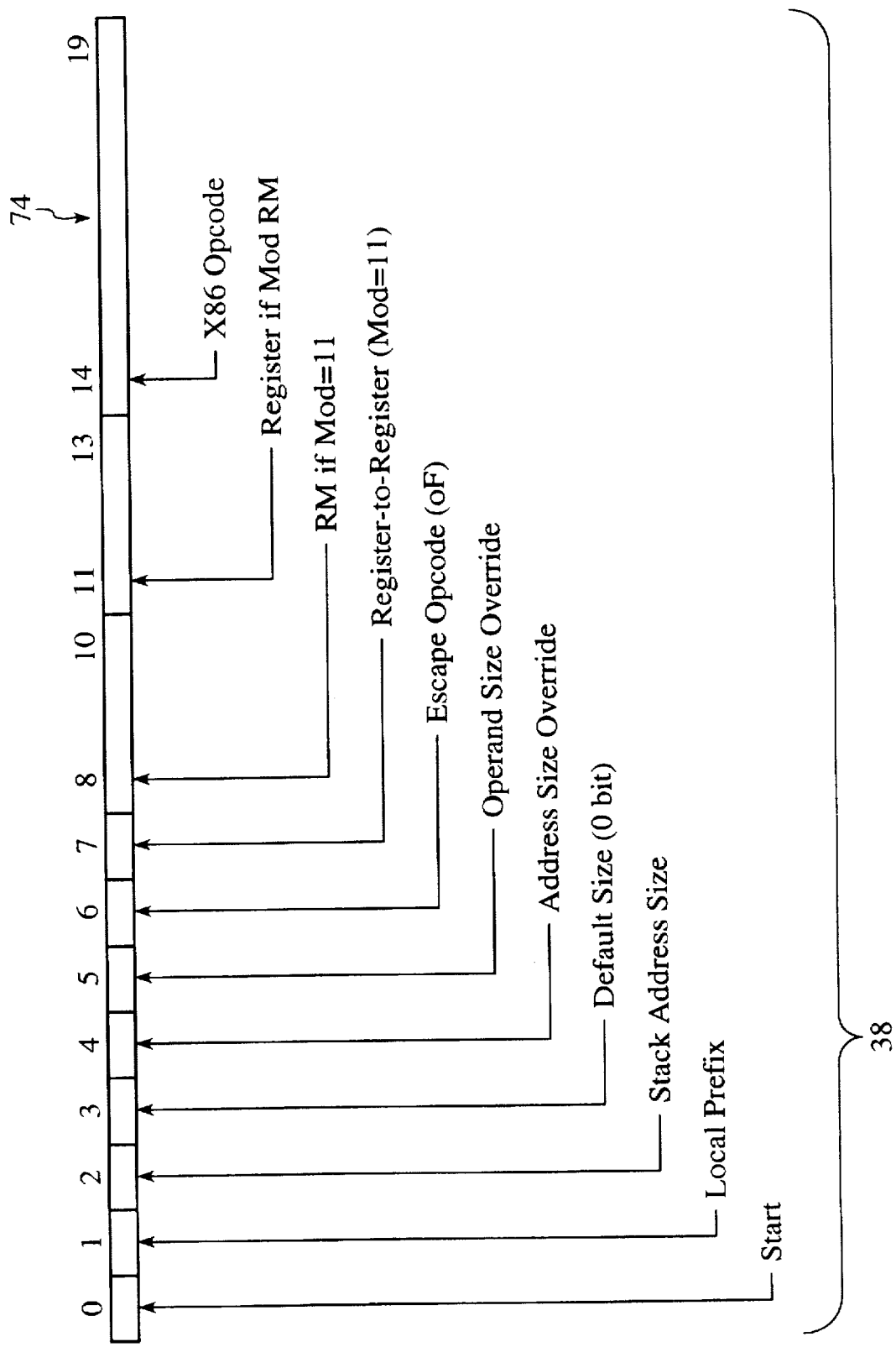
FIG. 3 is a block diagram of one particular embodiment of the opcode key used to map a particular guest instruction.

Referring now to FIG. 2, a block diagram of the EAU 36 is shown. The EAU 36 includes an instruction buffer 50, a pre-fetch unit 52, special-purpose registers (SPRs) 54, a decode unit 56, a branch history table 58, a tag generation unit 60, a guest cache (gcache) 62, and a gcache instruction queue 64. The function of the EAU 36 is to assist the processor 10 in emulating guest instructions 38.

During operation of the EAU 36, a guest instruction 38 is first pre-fetched by the pre-fetch unit 52 from the data cache 16. The guest instruction 38 is then loaded into the instruction buffer 50 and transferred to the decode unit 56. If the instruction 38 is a branch, the branch history table 58 is used to predict the next pre-fetch address.

Direct mapping of guest instruction 38 is difficult for a variety of reasons, such as the syntax of the guest instruction. For example, an x86 guest instruction has variable length. The host architecture of the preferred embodiment is PowerPC, which has instructions of fixed length. In addition, the opcode bytes of an x86 instruction are often insufficient to understand the instruction's function. Thus, x86 architecture has additional mode bits, which provide the remaining information necessary to understand the instruction. Consequently, during mapping, the preferred embodiment must take into account both the opcode bytes as well as the additional mode bits of the x86 architecture. Since a direct mapping of a guest instruction 38 to a host address is complicated, decode unit 56 is used to parse or decode a guest instruction 38 to determine length, branch type, and immediate data.

Gcache 62 is an array that includes an entry for the address of the recently used semantic routine 40 corresponding to a guest instruction 38 that is executed. After guest instruction 38 is decoded, tag generation unit 60 converts guest instruction 38 into a unique opcode tag. The tag is used to determine where in gcache 62 the address of semantic routine 40 is stored. The operation of tag generation unit 60 and gcache 62 will be explained more fully below.

Referring to FIG. 2, once the address is determined, the address is provided to instruction queue 64. Each entry in the gcache instruction queue 64 includes an offset field and a data field. The offset field points to the semantic routines 40. The data field includes the immediate data from the guest instruction 38 that the semantic routine 40 is to process. In a preferred embodiment of the present invention, the offset field and the data field containing the immediate data for the currently executing X86 instruction are stored in the SPRs 54.

Figure 4:
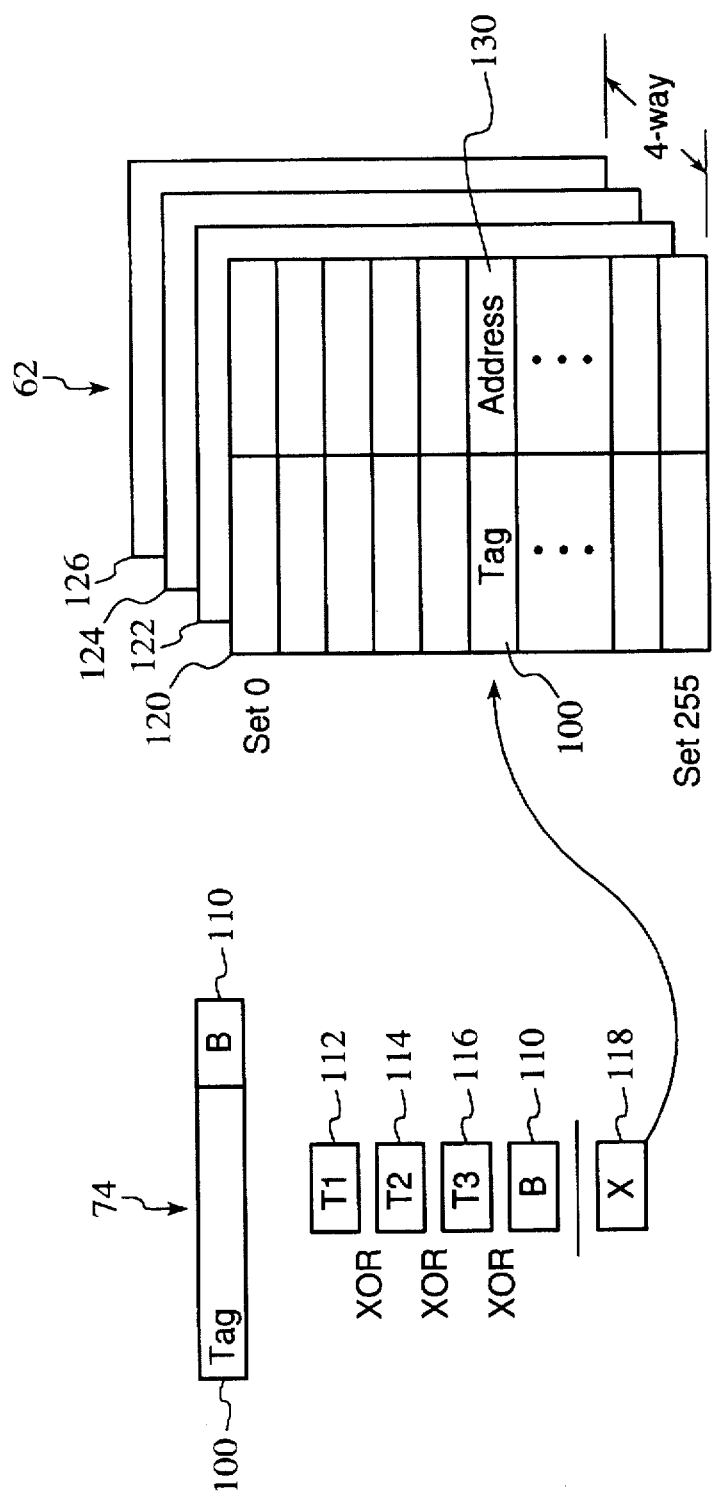
FIG. 4 is a block diagram of one embodiment of the hashing used to efficiently store guest instructions.

Referring to both FIGS. 1, 2 and 4, processor 10 fetches the first address 130 entered in the instruction queue 64 via line 66, and retrieves the appropriate semantic routine 40 from memory 12 for execution. The last instruction in each semantic routine 40 is a branch instruction, which in a preferred embodiment, is a guest dispatch complete (gdispc) instruction 68. When the processor 10 fetches and decodes a gdispc instruction 68, it causes the processor 10 to fetch, via line 68, the address of the next semantic routine 40 from the instruction queue 64. In a preferred embodiment, the address of the x86 instructions to be executed is stored in the next instruction pointer (IP) 72. The decode of the gdispc instruction 68 also causes the next IP 72 to be moved into the current IP 70. Also in a preferred embodiment, the gdispc instruction is an unconditional branch instruction, but any instruction that causes the processor to fetch the next semantic routine may be used.

As previously discussed, conventional methods for mapping the guest instruction to an address are inefficient. In particular, these methods require a significant amount of space in memory 12 to store the addresses of semantic routines 40. However, programs typically use only a small subset of the total possible number of semantic routines 40. Consequently, only a small subset of the memory set aside for storage of addresses will actually be used. This subset of memory is typically randomly distributed in the host processor's memory. This random distribution of addresses also slows access to semantic routines because the processor caches lack the spatial quality of referral.

The operation of tag generator 60 and gcache 62 address this problem by providing a method and system for efficiently mapping a guest instruction 38 to an unique opcode tag and the address of the corresponding semantic routine 40. The addresses of semantic routines 40 are efficiently stored in a cache, and can be quickly accessed.

In a preferred embodiment, decode unit 56 partially decodes the variable length guest instruction 38. Guest instruction 38 is then mapped to a fixed length opcode key. Currently, conversion into a single 32 bit opcode key is preferred.

Opcode key 74 includes information requesting and additional state information of operation, operands and any node information but not the immediate data of the corresponding guest instruction 38.

The preferred embodiment maps opcode key 74 to an index and an unique opcode tag. Thus, after guest instruction 38 is decoded, tag generation unit 60 also converts opcode key 74 into a unique opcode tag and an index using a hashing function.

FIG. 4 depicts the hashing of opcode key 74 to an index 118 and an opcode tag 100. The hashing function maps opcode key 74 into index 118 and a unique opcode tag 100.

In the preferred embodiment, index 118 is 8 bits and tag 100 is 12 bits. Index 118 determines where in gcache 62 opcode tag 100 and the address 130 of the corresponding semantic routine are stored.

Referring to FIG. 4, the preferred embodiment generates 8 bit index (X) 118 using XOR functions. The preferred embodiment XORs bits 112, 114, and 116, with a portion (B) 110 of opcode key 74, resulting in index 118. The 12 bits remaining after index 118 is generated become the opcode tag 100.

In the B portion, T1, T2 and T3 are cell 8 bits wide. B portion 110 is a set of unique bits. T1, T2, T3 are utilized to provide the tag bits. The B portion is XOR with T1, T2 and T3 to generate a pseudorandom number of bits that identify a unique location of the tag in the gcache C2.

As depicted in FIG. 4, gcache 62 stores opcode tag 100 and address 130 in locations corresponding to index 118. In the preferred embodiment, gcache 62 is comprised of a 4-way set-associative cache including internal arrays 120, 122, 124, and 126. Each internal array 120, 122, 124, or 126 of the preferred embodiment contains 256 entries. Index 118 corresponds to one of the 256 entries in each array. Thus, each index 118 has a set of four possible entries, one entry for each array. This set of four entries is used to store to different opcode tags 100 associated with the same index. Although the preferred embodiment has a set of four entries corresponding to one index 118, this is not meant to restrict the method and system to set sizes of four entries for each index 118.

In the preferred embodiment, once the set of four entries corresponding to index 118 is found, the hardware performs an associative (parallel) search on the 4 possible locations in the set to find unique opcode tag 100. If guest instruction 38 has not been emulated previously, opcode tag 100 will not be in gcache 62. If opcode tag 100 is not found within gcache 62, the preferred embodiment jumps to a special address. Software at the special address will determine the appropriate address of semantic routine 40 and update gcache 62 with the appropriate address. Thus, the first time guest instruction 38 is emulated opcode tag 100 is stored in gcache 62 with address 130 of semantic routine 40.

If guest instruction 38 has been emulated previously, opcode tag 100 will be found in the set corresponding to index 118. If opcode tag 100 is found in gcache 62, host address 130 of the corresponding semantic routine 40 is accessed. Thus, address 130 is quickly and efficiently found.

The preferred method of hashing opcode key 74 evenly and efficiently distributes the addresses of semantic routines 40 in gcache 62. Consequently, search time for finding the address of a semantic routine 40 corresponding to a guest instruction 38 is significantly reduced. This reduction in time required to find the address 130 of a particular semantic routine 40 is explained below.

To find address 130, the preferred embodiment searches gcache 62 for opcode tag 100. To do so, the preferred embodiment first searches gcache 62 for the index 118 associated with opcode tag 100. This immediately reduces the search field from a possible 1024 entries in gcache 62 to 256 possible indices 118. Consequently, the hashing method used to map opcode key 74 to index 118 and opcode tag 100 narrows the search for opcode tag 100 from 1 in 1024 to 1 in 4.

The method and system for mapping guest instruction 38 to opcode tag 100 and address 130 are also dynamic. Mapping a new guest instruction 38 to a new opcode tag 100 will result in the special software being accessed and the appropriate address being stored in gcache 62 along with the opcode tag 100. Once address 130 is stored in gcache 62, the special software will no longer be accessed for that particular guest instruction 38. Instead, the stored address 130 will be found in gcache 62 and the corresponding semantic routine 40 will be accessed. Consequently, the method and system quickly discover what set of semantic routines 40 are associated with the guest instruction 38 being run. The semantic routines 40 corresponding to frequently utilized guest instructions 38 can rapidly be accessed because their addresses 130 are stored in gcache 62 the first time the guest instruction 38 is emulated. The method and system are, therefore, dynamic.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

We claim:

1. An emulation assist unit for assisting a host processor in emulating a set of guest instructions using semantic routines, each of the semantic routines being stored at a specific address in memory, the emulation assist unit comprising:

a decoder for translating each of the guest instructions;

a tag generator coupled to the decoder for mapping each of the translated guest instructions to a tag; and a cache coupled to the tag generator for storing the tag and the associated specific address; wherein the emulation assist unit causes the processor to execute the semantic routine located at the specific address.

2. The system of claim 1 wherein the tag generator provides the tag by mapping a guest instruction to a key, then mapping the key to the tag.

3. The system of claim 2 wherein the key is of fixed length.

4. The system of claim 3 wherein the key is 20 bits long.

5. The system of claim 2 wherein the tag comprises at least a portion of the key.

6. The system of claim 1 wherein the tag generator further provides an index corresponding to the guest instruction.

7. The system of claim 6 wherein the cache further comprises a set-associative cache, each set having a plurality of entries corresponding to an index.

8. The system of claim 7 wherein the index corresponds to a plurality of tags, each tag being stored in one of the plurality of entries corresponding to the index.

9. The system of claim 8 wherein each set further comprises 4 entries.

10. The system of claim 9 wherein the index is 8 bits long.

11. The system of claim 7 wherein the emulation assist unit locates a particular tag by performing an associative search on the entries of the set corresponding to a particular index.

12. The system of claim 1 wherein the tag and the specific address are stored in the cache the first time the guest instruction is emulated, thereby ensuring that the emulation assist unit dynamically responds to the set of guest instructions being emulated.

13. The system of claim 12 wherein the tag generator provides the tag by mapping a guest instruction to a key, then mapping the key to the tag.

14. The system of claim 13 wherein the key is of fixed length.

15. The system of claim 14 wherein the key is 20 bits long.

16. The system of claim 13 wherein the tag comprises at least a portion of the key.

17. The system of claim 12 wherein the tag generator further provides an index corresponding to the guest instruction.

18. The system of claim 17 wherein the cache further comprises a set-associative cache, each set having a plurality of entries corresponding to an index.

19. The system of claim 18 wherein the index corresponds to a plurality of tags, each tag being stored in one of the plurality of entries corresponding to the index.

20. The system of claim 19 wherein each set further comprises 4 entries.

21. The system of claim 20 wherein the index is 8 bits long.

22. The system of claim 18 wherein the emulation assist unit locates a particular tag by performing an associative search on the entries of the set corresponding to a particular index.

23. An emulation assist unit for assisting a host processor to emulate a set of guest instructions using semantic routines, each of the semantic routines being stored at a specific address in memory, the emulation assist unit comprising:

decoder for translating each of the guest instructions;

a tag generator coupled to the decoder for mapping each of the translated guest instructions to a key and mapping the key to a tag corresponding to each of the guest instructions; and a cache coupled to the tag generator for storing the tag and the associated specific address, wherein the emulation assist unit causes the processor to execute the semantic routine located at the specific address.

24. The system of claim 23 wherein the tag and the specific address are stored in the cache the first time the guest instruction is emulated, thereby ensuring that the emulation assist unit dynamically responds to the set of guest instructions being emulated.

25. The system of claim 24 wherein the tag further comprises at least a portion of the key.

26. The system of claim 24 wherein the tag generator further provides an index corresponding to the guest instruction.

27. The system of claim 26 wherein the cache further comprises a set-associative cache, each set having a plurality of entries corresponding to an index.

28. The system of claim 27 wherein the index corresponds to a plurality of tags, each tag being stored in one of the plurality of entries corresponding to the index.

29. The system of claim 28 wherein the emulation assist unit locates a particular tag by performing an associative search on the entries of the set corresponding to a particular index.

30. The system of claim 28 wherein each set further comprises 4 entries.

31. The system of claim 28 wherein the index is 8 bits long.

32. The system of claim 28 wherein the index is generated by successively XORing a at least one bit and at least a portion of the key.

33. The system of claim 32 wherein the index is generated by successively XORing three bits and a at least a portion of the key not used to provide the tag.

34. A method for use in an emulation assist unit for mapping a guest instruction to an address of the corresponding semantic routine comprising the steps of:

(a) providing the guest instruction to the emulation assist unit;

(b) mapping the guest instruction to a tag indicating where the address is stored;

(c) providing the tag to a cache;

(d) searching the cache for the tag;

(e) if the guest instruction has been previously implemented, finding the tag and the address stored in the cache in conjunction with the tag;

(f) if the guest instruction has not previously been implemented, determining the address of the corresponding semantics routine and storing in the cache the tag in conjunction with the address; and (g) providing the address of the corresponding semantic routine to a host processor.

35. The method of claim 34 wherein step (b) comprises the additional step of providing an index in conjunction with the tag.

36. The method of claim 34 wherein the cache comprises a set-associative cache, each set having a plurality of entries corresponding to the index.

37. The method of claim 35 wherein step (d) comprises the steps of:

(di) searching the cache for the index; and searching the entries of each array corresponding to the index for the tag.

38. The method of claim 37 wherein step (dii) is performed using an associative search.

39. The method of claim 34 wherein step (b) comprises the steps of:

(bi) mapping the guest instruction to a key;

(bii) mapping the key to the tag and the index.

40. The method of claim 39 wherein the key of step (i) has fixed length.

41. The method of claim 39 wherein the index of step (bii) is formed by successively XORing at least one bit and at least a portion of the key.

42. The method of claim 41 wherein the index of step (bii) is formed by successively XORing three additional bits and at least a portion of the key.

43. The method of claim 39 wherein the tag comprises at least a portion of the key.

* * * * *